(12) United States Patent
Geaghan

(10) Patent No.: US 9,081,448 B2
(45) Date of Patent: Jul. 14, 2015

(54) DIGITIZER USING MULTIPLE STYLUS SENSING TECHNIQUES

(75) Inventor: Bernard O. Geaghan, Salem, NH (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 519 days.

(21) Appl. No.: 13/289,092

(22) Filed: Nov. 4, 2011

(65) Prior Publication Data

US 2013/0113762 A1    May 9, 2013

(51) Int. Cl.
*G06F 3/044*    (2006.01)
*G06F 3/0354*   (2013.01)

(52) U.S. Cl.
CPC ............ *G06F 3/044* (2013.01); *G06F 3/03545* (2013.01); *G06F 2203/04106* (2013.01)

(58) Field of Classification Search
USPC ............... 345/173–183; 178/18.06–18.11, 178/19.01–19.07
See application file for complete search history.

(56) References Cited

U.S. PATENT DOCUMENTS

| | | | |
|---|---|---|---|
| 4,686,332 A | 8/1987 | Greanias et al. | |
| 4,723,836 A | 2/1988 | Kono et al. | |
| 5,134,689 A | 7/1992 | Murakami et al. | |
| 5,365,461 A | 11/1994 | Stein et al. | |
| 5,543,587 A | 8/1996 | Ikura et al. | |
| 5,638,093 A | 6/1997 | Takahashi et al. | |
| 6,377,249 B1 | 4/2002 | Mumford | |
| 6,394,610 B2 | 5/2002 | Rodriguez, Jr. | |
| 6,663,008 B1 | 12/2003 | Pettersson et al. | |
| 6,762,752 B2 | 7/2004 | Perski et al. | |
| 6,871,149 B2 | 3/2005 | Sullivan et al. | |
| 7,009,663 B2 | 3/2006 | Abileah et al. | |
| 7,288,753 B2 | 10/2007 | Cok | |
| 7,348,969 B2 | 3/2008 | Robrecht et al. | |
| 7,646,377 B2 | 1/2010 | Geaghan | |
| 7,683,890 B2 | 3/2010 | Geaghan | |
| 7,781,722 B2 | 8/2010 | Lieberman et al. | |
| 7,924,272 B2 | 4/2011 | Boer et al. | |
| 2003/0156087 A1 | 8/2003 | Boer et al. | |
| 2004/0032399 A1 | 2/2004 | Sekiguchi et al. | |
| 2005/0110777 A1 | 5/2005 | Geaghan et al. | |
| 2005/0110781 A1 | 5/2005 | Geaghan et al. | |
| 2005/0146517 A1 | 7/2005 | Robrecht et al. | |
| 2006/0250381 A1* | 11/2006 | Geaghan ........................ 345/179 |
| 2006/0279548 A1* | 12/2006 | Geaghan ........................ 345/173 |
| 2010/0300773 A1 | 12/2010 | Cordeiro et al. | |

OTHER PUBLICATIONS

U.S. Appl. No. 61/507669, filed Jul. 14, 2011, "Digitizer Using Position-Unique Optical Signals".

* cited by examiner

*Primary Examiner* — Michael Faragalla
(74) *Attorney, Agent, or Firm* — Clifton F. Richardson

(57) ABSTRACT

A digitizer system utilizing two location measurement techniques that operate in cooperation to improve the operation of the digitizer. The first location measurement technique provides a first, or coarse, stylus location. The second location measurement technique provides a second, or fine, stylus location.

35 Claims, 5 Drawing Sheets

DIGITIZER USING MULTIPLE STYLUS SENSING TECHNIQUES

FIELD OF THE INVENTION

The present invention relates to stylus digitizer devices and, more particularly, to methods and systems using multiple sensing techniques to measure the location of a stylus relative to a digitizer sensor and/or location of a stylus relative to a display.

BACKGROUND

Digitizers can provide a simple and intuitive way for a user to use a stylus to interface with a computer system, particularly for handheld and mobile computing applications. As mobile computing applications become more powerful, and users demand functionalities such as handwriting recognition, direct note taking on a computer platform, drawing, and so forth, additional requirements are placed on the input device in terms of accuracy and functionality.

SUMMARY OF THE INVENTION

Disclosed herein is a digitizer system including two location measurement techniques that operate in cooperation to improve the operation of the digitizer. When sensing the location of a stylus, using two methods may result in improvement in accuracy, power dissipation, coordinate measurement rate, measurement distance (from a display or digitizer surface), and/or alignment of digitizer coordinates with displayed images.

In one embodiment, the first locating technique provides an approximate (or coarse) location for the stylus. A video cursor image may then be displayed at the approximate location, and the stylus will recognize the cursor image within its field of view. The image may then be moved on the display until it is centered in the field of view of the stylus, and the location of the centered cursor is the desired location of the stylus field of view.

In some embodiments, the stylus cursor may be minimally visible due to momentary flashing onto display 11, or by visibly obscure patterning as described in for example U.S. Pat. No. 7,646,377.

In some embodiments, the stylus cursor may have features that indicate its orientation with respect to the display.

In some embodiments, the motion of the stylus relative to the display pixels can be tracked and combined with the initial coordinates of the stylus to track stylus location during movement.

BRIEF DESCRIPTION OF THE DRAWINGS

In the figures, like reference numerals designate like elements.

DETAILED DESCRIPTION

Figure 1:
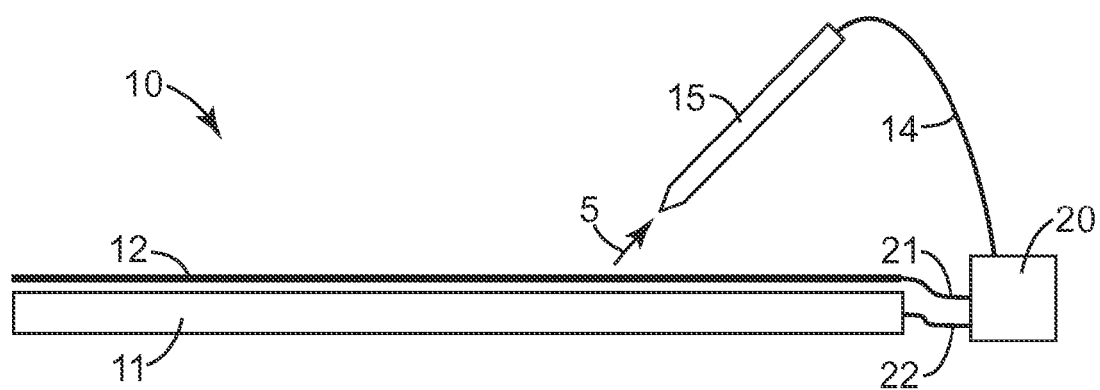
FIG. 1 is a drawing of a digitizer system.

The present disclosure is directed to a digitizer system comprising a stylus and a sensor, that combines more than one technique to determine the location of the stylus relative to the sensor. In many embodiments, such a sensor will be located proximate a display—either in front of it, behind it, or in some embodiments integral with it. In some embodiments, the sensor may be the display itself. In many embodiments, different location measurement techniques may each use a different sensor. The term sensor as used herein refers to a component that provides reference coordinate system for the stylus. The sensor may emit signals, receive signals, or both. For the purposes of this disclosure, a combination of display and sensor will be assumed, though in practice the sensor component could exist independent of a display. For example, a first sensing technique locates a rough position of a stylus upon a display. Such a rough position might be acceptable, natively, for selecting bulky icons on a graphical user interface (GUI), but may be too imprecise for interactions with the GUI that require more precision, such as signature capture or the manipulation of small objects presented on the display.

The first sensing technique may comprise any one of several different technologies known in the art. Some techniques are listed in Table 1, discussed further later in this disclosure. In one embodiment, a sensor having a first and second array of electrodes, arranged orthogonally from each other, are separated by a dielectric to form a matrix sensor. The electrodes may be a transparent conductive oxide, fine pitch metal, or any suitable conductive material. The sensor itself may be transparent or opaque. Electronics coupled to the arrays drive certain electrodes while sensing other electrodes, to ascertain values indicative of mutual capacitance that exist at nodes in the matrix. Such mutual capacitances vary with the approach of conductive objects such as fingers or conductive styli, which allows for the electronics to determine the positions of one, and often many, objects proximate to the sensor. Alternatively, the stylus may generate a voltage that couples to the first and second array of electrodes, where stylus-generated signals are received. Interpolation techniques may be used to further develop the position of objects relative to electrodes on the matrix.

As described further herein, this mutual capacitive sensing scheme may be used to measure stylus touchdown, and it may roughly locate the X-Y coordinate location of a stylus on the sensor. However, to precisely locate the stylus X-Y location, a further, second sensing technique is used.

For example, upon touch-down of the stylus upon the sensor, the touchdown state (Z-axis) and a rough X-Y position is determined. The rough X-Y position may vary substantially based on the type of sensor and sensing technology employed. For the purpose of explanation, it may be an area 1 cm×1 cm square. This rough, or coarse position correlates to the approximate touch-down area of the stylus tip, which may include an optical sensor element in its tip capable of sensing displayed pixels. Controller electronics may cause pixels in the touch-down area to include a unique signal component, such as a shape or color, that allows the stylus optical sensor to determine precisely where within the touch-down area it is located, i.e., the fine position. Movements of the stylus upon the sensor may be tracked by causing signals in the immediate path of the stylus to similarly exhibit unique signal components. Pixels behind the stylus path are quickly returned to their native color, such that the changes to pixels in the display area of the stylus are not readily noticeable to a user.

The switch from the coarse sensing technique to the fine sensing technique may be effected in many different ways. In application-specific embodiments, the coarsely sensed object may yield a stylus location that is sufficient for an icon selection task with no further measurements necessary, or the application may automatically switch to a more appropriate measurement technique. For example, in a signature capture system, a coarse X-Y location may be determined using a first technique, possibly during pre-touchdown hover measurements. The first technique (or another technique) may also be used to measure touchdown. After touchdown a second, more accurate technique may be immediately used to measure the strokes of the signature.

In some embodiments, an optical sensor in the stylus may sense that it is approaching display pixels and thus signal to controller electronics that the stylus is in proximity with the display and also pointing in the direction of the display. The stylus may contain a force-sensitive switch, which upon touchdown of the stylus tip causes the stylus to communicate, preferably wirelessly through a protocol such as Bluetooth, state-type information to controller electronics.

Depending on the technology used to effectuate the first and the second sensing techniques, they need not be mutually exclusive—that is, the first sensing can occur simultaneous to the second sensing, and the determination of stylus location may be based on measurements by the first technique under some operating conditions, and it may be based primarily on measurements by the second technique under other operating conditions. This may be advantageous in some situations where, for example, the second sensing technique is preferable because it is more accurate, but movement of the stylus relative to the sensor is sometimes too fast for the second technique to keep up with the movement of the stylus. Controller electronics can sense this condition and revert to first sensing technique until the stylus slows down enough to be effectively sensed using the second location sensing approach.

FIG. 1 shows display and stylus digitizer system 10 comprising display 11 with digitizer sensor 12 which may be a transparent capacitive, resistive, or electro-magnetic (E-M)-type overlay, or it may be printed with position-unique indicia. Digitizer sensor 12 may in some embodiments also operate as a sensor sensitive to touches of non-stylus objects, such as fingers. In practice most touch sensors may sense the touch-down of objects in addition to fingers, and some sensors can sense the approach of objects, an effect sometimes referred to as pre-touch or hover. Controller 20 controls displayed images via link 22. Controller 20 activates and receives position signals from digitizer sensor 12 which indicates the position of stylus 15 relative to sensor 12. Controller 20 may also serve as the system processor for a system, for example a portable computing system. Though controller 20 is shown as one box in FIG. 1, it may exist as discrete electronic sub-systems, for example, a first sub-system to interact with digitizer sensor 12 and/or stylus 15, and a second sub-system to interact with display 11. Link 21 couples controller 20 to digitizer sensor 12. Depending on the particulars of the type of digitizer sensor 12 that is selected, link 21 may carry both drive and receive signals between controller 20 and digitizer sensor 12. Stylus 15 is communicatively coupled with controller 20 by link 14. Link 14 may be a bundle of thin wires, but more preferably link 14 is a wireless radiofrequency (RF) link, and in such a construction stylus 15 and controller 20 include radios for back-and-forth communication. Such radios in one embodiment implement the Bluetooth™ communications protocol. Stylus 15 may have an optical detector that can detect displayed video 5 within its field of view (FOV).

Alternatively or in addition, digitizer sensor 12 may be located under display 11. E-M digitizers are often behind a display, and some optical digitizers including some "IR-based sensing" types may be located behind a display. In further embodiments, the digitizer sensor 12 may be integral to the display, or the display itself may be the digitizer for some location measurement techniques.

When a digitizer system comprises a display 11 and a separate sensor 12, the coordinate system of the display must be aligned with the coordinate system of the separate sensor. This is true, for example, of most E-M, capacitive coupling, and resistive digitizers that use a sensor that is attached to a display. Methods of aligning coordinate systems are known in the art. Generally, a calibration procedure is used to align the display and sensor coordinates prior to use. Such calibration can align the X-Y coordinates of a display and sensor, but some sources of error including parallax may not be addressed by typical X-Y coordinate calibration methods.

Digitizer sensor 12, in combination with controller 20, stylus 15, and display 11, support a first stylus detection technique and a second stylus detection technique. The techniques may be related or essentially the same, technologically, or they may be very different.

For example, the first detection technique might be based on mutual-capacitive sensing in a matrix-type sensor, where a first array of electrodes is dielectrically separated from a second array of electrodes arranged orthogonally to the first array, to form intersecting nodes as described previously. Sensing techniques will, of course, have different types of sensors and supporting electronics in controller 20.

The second detection technique might be based on an optical sensor disposed in stylus 15, as will be described more fully later.

Possible second sensing techniques include, by way of example and not limitation: capacitance-to-ground, or mutual capacitive-based sensing, as described for example in US Patent Application Publication No. 2010/0300773, "High Speed Multi-Touch Touch Device and Controller Therefor"; resistive-based sensing, as is well known in the art; IR-based sensing, as is described for example in U.S. Pat. App. No. 61/507,669, "Digitizer using Position-Unique Optical Signals"; pixel tracking-based sensing, as is described for example in U.S. Pat. No. 7,646,377, "Position Digitizing Using Optical Stylus to Image a Display"; and bending wave-type sensing, as is described, for example, in U.S. Pat. No. 6,871,149, "Contact Sensitive Device." Other first sensing techniques are known in the art and would be suitable for first sensing techniques.

Possible second sensing techniques include, by way of example and not limitation, the technologies listed as possible candidates for the first techniques, but in one preferred embodiment employ a technology based on the pixel tracking that was described in U.S. Pat. No. 7,646,377, referenced earlier, and hereby incorporated by reference in its entirety.

Figure 2:
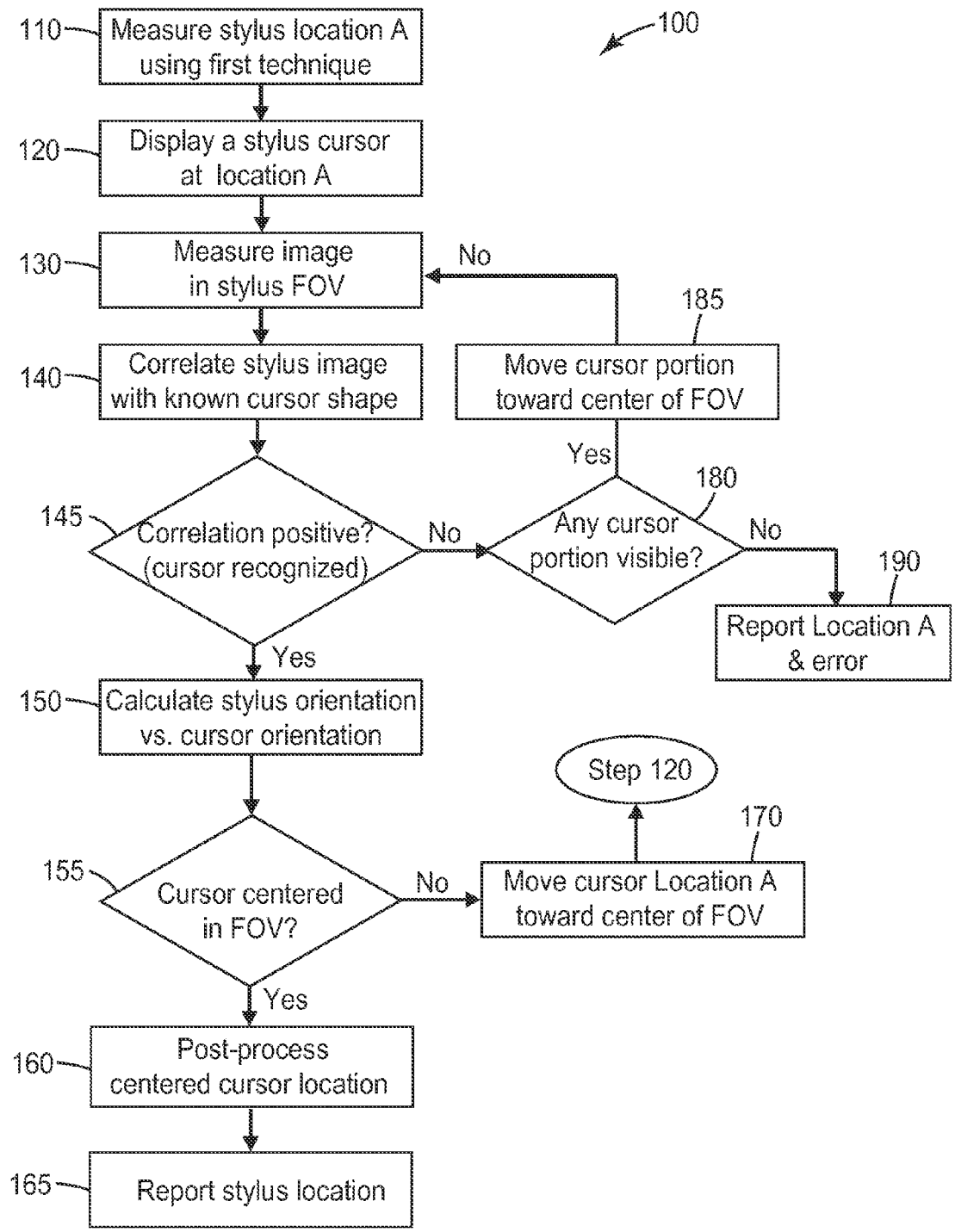
FIG. 2 is a flowchart showing an exemplary process that uses first and second location measurement techniques.

FIG. 2 is a flowchart illustrating one model process 100 by which the first and second sensing techniques are together used to determine the location of stylus 15 relative to digitizer sensor 12 (and by extension display 11). The location of the stylus is first measured using a first technique (step 110). For the purposes of illustration in this example, let us assume the digitizer technology is capacitive sensing with a substantially light transmissive sensor. Such digitizer technology may be well suited for detecting objects such as fingers, but by itself it may not have high enough fidelity for certain stylus-type features. The stylus tip, in this example, may be composed of a material that may be sensed by the mutual-capacitive based digitizer sensor and associated electronics, or the stylus may be activated with an AC voltage that is detected by the sensor. The first detection technique provides a first location measurement, "A". With the first location measured, controller 120 next switches to a second location technique, to perform a second stylus location measurement.

A stylus cursor is displayed on display 11 at point A (step 120). The cursor could be any suitable shape, but in this example it is T shaped, having a size in one embodiment just exceeding the expected variability in location measurement using the first technique. That is, the cursor will be displayed at point A, and will have an area that extends somewhat from point A such that, even given the variability that may exist in sensing the stylus using the first technique, the cursor, or at least some portion of it, will extend to be within the stylus' optical sensors' field-of-view (FOV). The stylus optical sensor next measures the stylus field-of-view (FOV), that is, the area of the display sensed by the stylus optical sensor (step 130). Next, the image from the stylus FOV is correlated with known cursor attributes (step 140). Such attributes could include color, pulse shape, shape, or any attribute possible from pixels in display 11.

If the correlation is negative (step 145) the stylus optical sensor cannot "see" the cursor. In Step 180, a determination is made whether any portion of the cursor is within the FOV of the stylus. If any portion of the cursor is visible, the cursor is moved toward the center of the FOV of the stylus in Step 185, and the image in the stylus FOV is re-measured to in Step 130. If in Step 180 a determination is made that no recognizable portion of the cursor is within the FOV, then in Step 190 Location A is reported as the best-available stylus location, with an error flag to indicate the second technique was not successful in imaging the cursor.

If a positive correlation between the stylus FOV image and the known cursor is detected, that is, the stylus image sensor "sees" the cursor ("Y" at step 145), then controller 20 calculates the difference in angle of rotation between the cursor image (which is referenced to the display coordinates) and the stylus sensor FOV image (which is referenced to the body of the stylus (see stylus body 42, described later in FIG. 3A). Next, controller 20 determines if the cursor is centered in the stylus FOV image (step 155). If it is not ("N" at step 155), new cursor coordinates are computed such that the cursor will, when displayed, be shifted toward the center of the stylus FOV image (step 170). For example, the cursor may be shifted to the right to pixels and up one pixel. Next, the stylus cursor is re-displayed at the newly computed coordinates (loop back to step 120) and the process thus repeats until the cursor is approximately centered in the stylus FOV image ("Y" at step 155). This looping has the effect of iteratively adjusting the cursor position, or honing the position, until it is within the stylus FOV. In one embodiment, such honing stops when the cursor is approximately centered within the stylus FOV, but in other embodiments this is not necessary so long as the difference between the cursor image and the center of the stylus FOV can be positively determined.

Step 160 includes any post-processing that may be required to calculate an accurate stylus tip location from the measured FOV center location. Post processing may include filtering of current and past measurements. Other parameters such as Z-axis distance or signal strength may be used to modify the measured FOV location. Post processing would also typically include calculating the stylus tip location based on the known difference between the stylus FOV center and the stylus tip. This process is known in the art.

If the digitizer sensor has a flat surface that is parallel to the display surface during use, (like a mouse is parallel to the table it is used on), then the cursor position at the center of the FOV may be reported as the stylus location in Step 165. If the stylus is a pen-like device that may be tilted with respect to the plane of the display, then the cursor centered in the stylus FOV indicates that the cursor aligns with the optical axis of the stylus. But the image detector of the stylus is often offset from the stylus tip so the optical FOV may not correspond to the stylus tip location. Also, displayed pixels may be several millimeters below the surface of the sensor or the display, so parallax may cause an additional difference between the FOV center and the stylus tip location. Given a known distance between stylus tip and optical FOV, and the stylus rotational orientation and tilt angle, the stylus tip location can calculated from the FOV.

Finally, the coordinates of the stylus tip are reported in Step 165. Stylus FOV center location may also be reported.

In this way, a first detection technique (step 110) is used to perform a first location measurement of a stylus, and a second detection technique (step 130 and beyond) is used to perform a second location measurement of the stylus.

The second cursor detection technique could be used to track movements of the stylus, depending on how fast the second detection technique can iterate. If the stylus if moving too quickly (that is, the stylus gets out in front of the cursor such that the stylus "looses" the cursor (or, more accurately, the cursor looses the stylus), the second sensing technique would error out (step 190) and depending on the error condition, the first detection technique could re-detect the stylus. Coordinate information lost during such fast movements could be approximated and reported by controller 20.

Figure 3A:
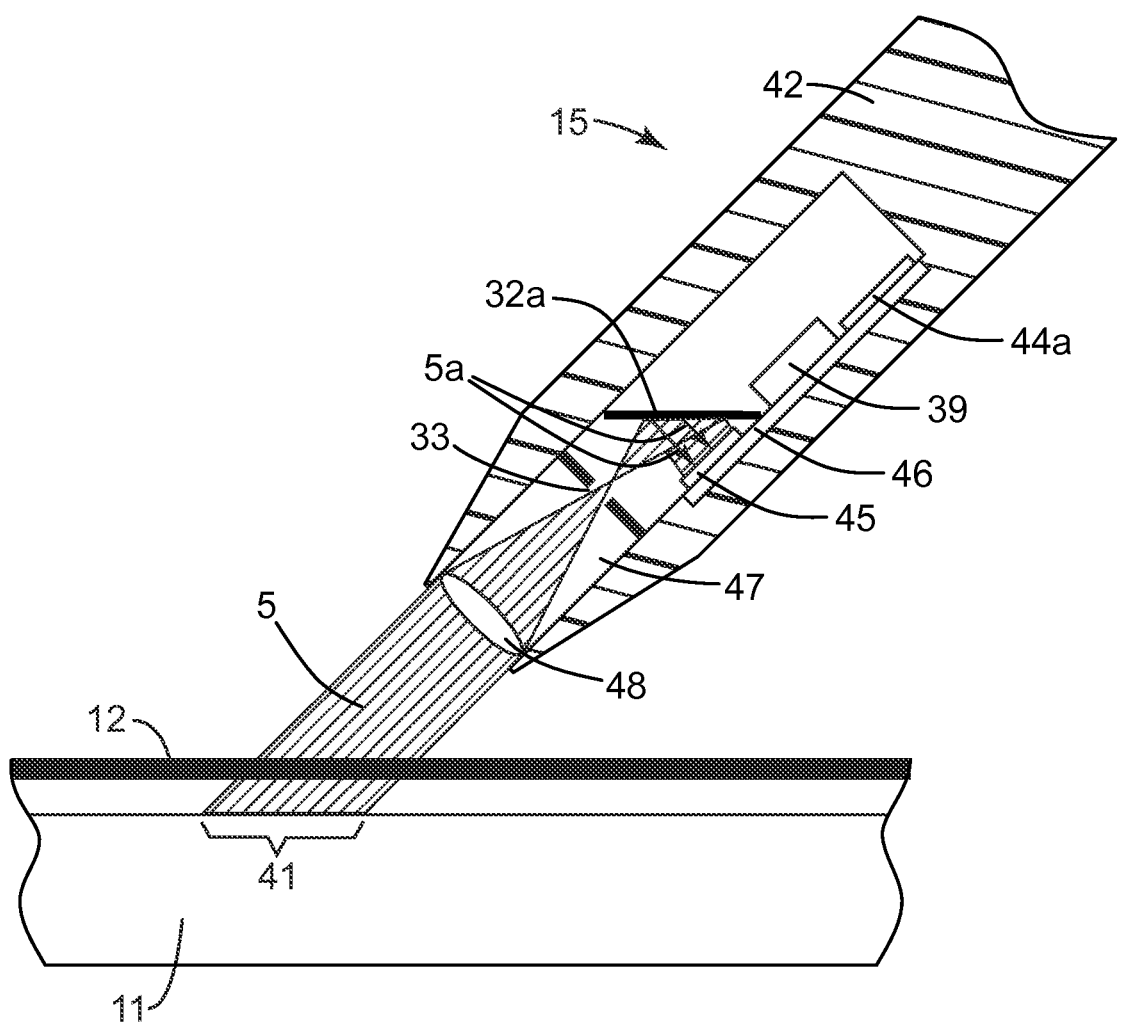
FIG. 3A-3B are diagrams of a stylus interacting with a digitizer system.

FIG. 3A shows a cross sectional view of the working end of stylus 15. The optical imaging technique of stylus 15 operates on light 5 emitted from within the field of view (FOV) area 41 of display 11. Light 5 passes through lens 48 and is focused through aperture 33 onto mirror 32a which reflects light 5 onto optical sensor 45, (as indicated by reflected light arrows 5a). Optical sensor 45 detects the light signals, which are conveyed to stylus processor 44a via conductors disposed upon printed circuit board 46. Stylus processor 44a may perform image processing and image recognition functions on the received signals, or it may transfer optical signal information to controller 20 (not shown in FIG. 3A) for further processing, to determine fine stylus location In one optional embodiment of stylus 15, stylus location circuit 39 is located within stylus body 42 to support a further, location measurement technique. Circuit 39 includes electronics that locate stylus 15 relative to digitizer sensor 12, using in this example a non-optical technique of operation. For example, where an electromagnetic (E-M)-type detector is used for location measurement (see devices sold by n-Trig, Wacom or Waltop, and as well known in the art and described in, for example, U.S. Pat. Nos. 4,723,836 and 6,762,752), circuit 39 may comprise a resonant circuit with an inductor and capacitor. Where E-M is used for stylus location measurement, stylus circuit 39 receives signals from and transmits signals back to transparent conductors in digitizer sensor 12. Digitizer sensor 12 (in this case an E-M type) has conductors which sequentially conduct an AC current, creating an E-M field to couple with the resonant circuit in stylus 15. The resonant circuit then couples its E-M signal back to conductors in digitizer sensor 12, where the signal is measured on multiple conductors and the location of the resonant circuit, and thus the stylus, is calculated.

In a further optional embodiment of stylus 15, stylus location circuit 39 may comprise a capacitive electrode near the aperture end 33 of stylus body 42 and a circuit that drives the capacitive electrode with an AC voltage, as is used in the 3M TouchPen system (see U.S. Pat. No. 5,365,461. Where a capacitive system is used for location measurement, stylus circuit 39 capacitively couples signals to one or more transparent conductors in digitizer sensor 12.

In yet a further optional embodiment of stylus 15, stylus location circuit 39 may comprise a circuit that emits acoustic signals from aperture 33 of stylus 15. The acoustic signals are received by multiple microphones at known locations around display 11 (not shown). Acoustic ranging systems and methods are well known in the art.

Figure 3B:
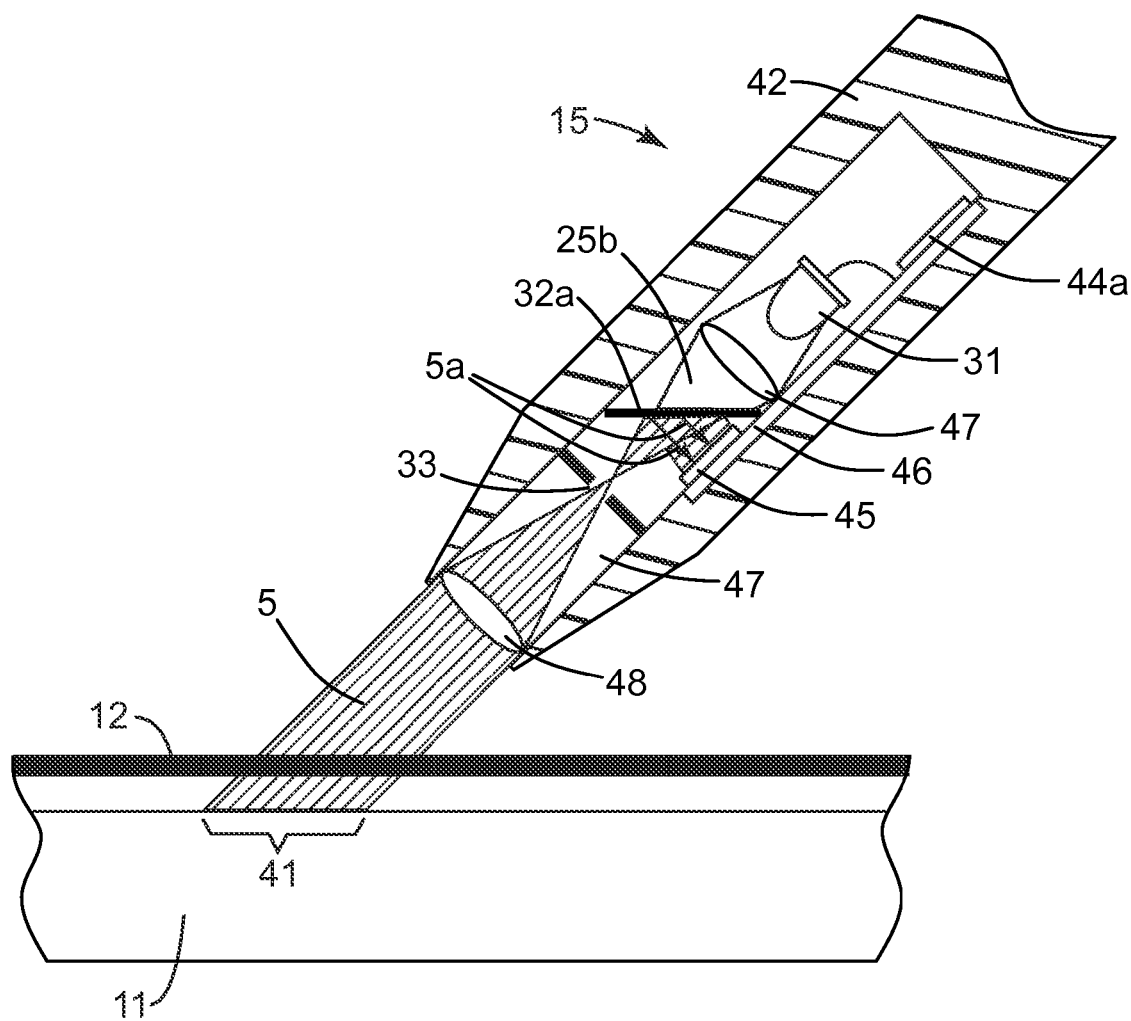

As compared with FIG. 3A, an alternative stylus configuration is shown in FIG. 3B, which shows a cross sectional view of stylus 16. Light 25 comprises visible light from display 11 that is patterned as visible displayed images, and IR light that is patterned as position-dependent time varying pulses. The optical imaging technique of stylus 16 operates on light 25 emitted from within the field of view (FOV) area 41 of display 11. Light 25 passes through lens 48 and is focused through aperture 33 onto beam splitter mirror 32b which reflects light onto optical sensor 45 as denoted by arrows 25a. Mirror 32b may be a dichroic mirror. Any IR light reflected toward optical sensor 45 is stopped by a filter (not shown) so it does not reach optical sensor 45. Stylus 16 also uses the Ratio of IR technique whereby ratios of position-unique infrared light are used to locate the stylus, as described in U.S. Patent Application No. 61/507,669, "Digitizer Using Position-Unique Optical Signals," the disclosure of which is hereby incorporated by reference. An IR portion 25 of light 25 passes through beamsplitter mirror 32b and is focused by lens 47 onto optical detector 31, where it is measured. Any non-IR light passed through mirror 32a toward detector sensor 31 is stopped by a filter (not shown) so it does not reach optical detector 31. Optical detector 31 is a photodiode or phototransistor that detects a value of light intensity versus time rather than a two dimensional image. Light intensity versus time detected by detector 31 is measured by stylus processor 44b. The resulting measured waveform is compared to the known sequence of infrared light pulsed from position-unique infrared sources, and the position of the stylus is calculated based on the ratio of relative magnitudes of the waveform at the times when each infrared source is active. Detector 31 is shown behind image detector 45, but it may be located beside detector 45, or it may be on the same semiconductor chip as detector 45. Calculation of location from IR signals may be performed by stylus processor 44b or signal data may be transferred to processor 20 for calculation. In one embodiment, IR ratio sensing could be used for coarse location detection, and the operation of sensor 45 could be used for fine location measurement.

In another embodiment, IR ratio measurement may be used to track fast stylus movements and sensor 45 may be used when the stylus moves more slowly. In another embodiment, IR ratio measurement may be used to track stylus movements when the stylus is so far from the display that an image of the display pixels cannot be measured by optical sensor 45, and sensor 45 may be used when the stylus moves closer to the display. In another embodiment, IR ratio detector 31 may be used to detect a pulse change in IR intensity at the wavelengths detectable by detector 31, indicating that stylus 16 is in proximity with display 11 and aimed at display 11. The IR pulse may wake processor 44a from a sleep mode. The IR pulse may cause processor 44a to alert processor 20 that stylus 16 is proximate display 11. Signal strength of IR pulses may indicate the approximate distance between stylus 16 and display 11, and stylus 11 may convey this distance (Z-axis) information to processor 20, or it may simply indicate whether a touchdown state is present or not. In another embodiment, in a stylus that does not include sensor 45, the infrared detector could be used for first location measurement in conjunction with a second sensing technology that determines coarse locations.

Table 1 shows exemplary stylus digitizer systems that could be used for either first (coarse) or second (fine) location measurement techniques. This table should not be seen as limiting, but instead is intended to demonstrate the wide range of available digitizer systems that could be utilized with embodiments described in this disclosure. Descriptions indicate sensing technique, stylus type, sensor type, a typical location of the sensor relative to a display, and if a display is used. A US patent reference is also given for each technique, which represents a typical deployment of each technology. Each technique implicitly has pros and cons with respect to X-Y accuracy, Z-axis range, touch-down detection accuracy, and speed, which would guide a skilled artisan in selecting which could be used for first and second location measurement techniques. Any of the techniques listed in Table 1 may be used for either the first measurement technique or the second measurement technique, and other techniques not listed may also be used. Table 1 is not a comprehensive list of possible techniques.

TABLE 1

| Technique | Stylus Type | Sensor Type | Location vs. Display | Vendor | Reference |
| --- | --- | --- | --- | --- | --- |
| Resistive | Any | Resistive membrane over resistive surface | Overlay | Nissha | U.S. Pat. No. 5,543,587 |
| Matrix Capacitive - Mutual | Conductive or AC voltage | X & Y arrays of electrodes | Overlay | 3M | US Pat. Pub. No. 2010/0300773 |
| Matrix Capacitive-to-ground | Conductive or AC voltage | X & Y arrays of electrodes | Overlay | 3M | U.S. Pat. No. 4,686,332 |
| Analog Capacitive-to-ground | Conductive or AC voltage | Resistive surface | Overlay | 3M | U.S. Pat. No. 5,365,461 |
| E-M | Resonant | X & Y arrays of conductors | Under display | Wacom | U.S Pat. No. 5,134,689 |
| E-M | Resonant | X & Y arrays of conductors | Overlay | n-Trig | U.S. Pat. No. 6,762,752 |
| Image sensing display | Light source | In-pixel light detecting array | In display | Planar | U.S. Pat. No. 7,009,663 |
| IR-based - Ratio of IR | Photodetector | Array of IR sources & light guide | Under display | 3M | US App. No. 61/507669 |

TABLE 1-continued

| Technique | Stylus Type | Sensor Type | Location vs. Display | Vendor | Reference |
|---|---|---|---|---|---|
| IR-based - Reflective | Any | IR sources & detectors in corners & reflectors on opposite edges | Front periphery | Lumio | U.S. Pat. No. 7,181,722 |
| IR based - Rear projected | IR reflective | IR sources & cameras behind rear projection surface | In display | Microsoft | U.S. Pat. No. 7,924,272 |
| Display sensing | Image detector | Indicia/cursor images on the display | In display | 3M | U.S. Pat. No. 7,646,377 |
| Fixed indicia patterns | Image detector | Substrate printed with indicia | Overlay | Anoto | U.S. Pat. No. 6,663,008 |
| Acoustic ranging | Acoustic source | Multiple acoustic detectors | Front periphery | | US Pat. Pub. No. 20040032399 |
| Surface acoustic wave | Vibration-absorbing | Substrate with acoustic signal sources & arrays of deflectors | Overlay | Elo | U.S. Pat. No. 5,638,093 |
| Bending wave | Vibration-generating | Substrate with acoustic signal detectors | Overlay | 3M | U.S. Pat. No. 6,871,149 |
| IR based - Rear projected | IR or UV source | IR or UV receivers | Front periphery | 3M | U.S. Pat. No. 6,394,610 |

Figure 4:
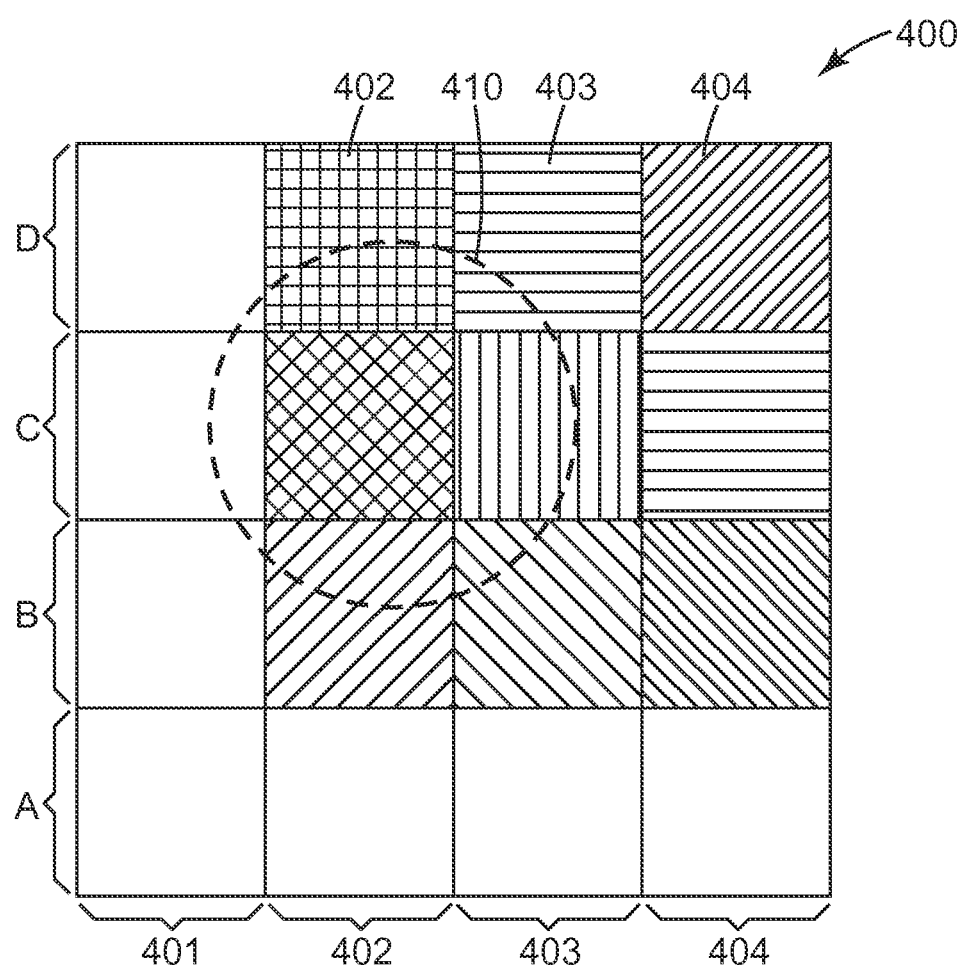
FIG. 4 is a drawing showing pixels on a display, a cursor, and a stylus' field-of-view.

FIG. 4 is a drawing of a 4×4 matrix of pixels as might exist on display 11. Rows A-D and columns 401-404 define individual pixels in the matrix. FOV 410 is a plan view of area 41 as seen in FIGS. 3A to 3C. Rough location measurement technique imprecisely determined a touchdown of stylus at pixel 403C, and, applying the technique described with respect to FIG. 2, would then display a cursor (here a 6×6 pixel cursor) centered around pixel 403C. Each pixel in the cursor is shown having some indicia, and as thusly described such indicia could be unique to each pixel in the cursor, or it could be unique to some portion of pixels but not others, and it could be explicit (easily recognizable to a viewer) or subtle (the existing pixel states may not even be modified if they have enough variability within them such that the fine location measurement technique, if optical in nature, can recognize them). For example, if pixels in the 6×6 cursor area each, in its own state, has a different color, then there may be no need to modify pixels in the cursor area. In other situations, certain of the pixels may be modified, but minimally so to achieve some minimal level of variability recognizable for the sensor in the stylus. According to an embodiment of the process described with respect to FIG. 2, the cursor would shift one pixel to the left, and the coarse location measurement (403C) would be updated based on the fine location measurement (402C). Depending on the sensitivity of the sensing optics in the stylus, the fine location measurement could be more accurate than single pixels—for example, the weighted average of the pixels could be used to determine the center of the FOV, and such information could then be reported as the fine location of the stylus. Of course, the cursor shown in FIG. 4 is only one embodiment and the actual cursor used could be different, for example different shapes, etc.

A further location measurement technique well suited for fine location measurement involves the use of static visual indicia. For example, small dots nearly imperceptible, or imperceptible, to the human eye may be overlaid upon a display (or upon a digitizer sensor or display used for first location measurement). The arrangement of dots uniquely define any space upon the digitizer sensor surface. Such technology is well known and described in numerous patent filings by Anoto company of Sweden. Given a first measurement, the universe of candidate dots could be narrowed in anticipation of a second location measurement technique. In this case, the second technique may be preferable, for example, when stylus movement is too fast for indicia recognition.

Thus far, embodiments have been described that use for coarse first measurement capacitive-based, infrared-based, and E-M-based technologies. For fine second measurement, candidate technologies include optical sensing and infrared-based. Depending on implementation particulars, coarse-based first measurement technologies could be used for fine location measurement and vice versa.

The embodiments described herein are exemplary only and should not be read as limiting. Many now existing, or later developed, location measurement techniques could be used for coarse location determination, and similarly many now existing, or later developed, location measurement techniques could be used for fine location measurement. Further, while described in terms of "coarse" and "fine", such descriptions are just for the purposes of illustration. In other words, there may be reasons other than, or in addition to, the increased fidelity of first location measurement technique as compared with a second location measurement technique that would cause one to combine more than one stylus location measurement techniques.

Z-axis

There are two issues with regard to Z-axis (height above a digitizer sensor or display surface). First, it is sometimes desirable to measure the Z-axis distance in addition to X-Y coordinates. Second, even if Z-axis is not measured, it is often desirable to measure X-Y coordinates over a range of Z-axis distances from touchdown of the stylus to various "hover" distances that may range from a few millimeters to 100 mm or more.

In addition to determining the X-Y position on a digitizer sensor, Z-axis information may also be determined and used in conjunction with any amenable location measurement technique referenced thus far. Certain technologies may inherently support Z-axis measurement.

Certain of the fine location measurement technologies thus described (particularly ones involving optical sensors as shown in FIGS. 3A-B) would allow for measurement of X-Y coordinates over a relatively large range of Z-axis distances. For example, at distance d1 an optical stylus may detect the presence of the digitizer/display, and at this point the stylus may activate (wake) from a low power mode and activate various stylus functions and/or it may send a specific status notification to controller 20 indicating it detects the presence of the display or the digitizer sensor. Alternatively stylus 15 may wake as a result of a user-operated switch, or a change on movement or orientation of stylus 15.

At a closer distance d2, stylus 15 may measure its approximate location (in X, Y) relative to the digitizer/display, and stylus 15 may send a specific status notification to system processor 20 indicating that it is sending approximate coordinates. The determination of coordinate accuracy may be based on the level of noise associated with coordinate measurements, (such as the difference in values among sequential measurements), or it may be based on signal levels or optical contrast ratios that are sufficient to yield calculated X-Y coordinates but are below optimal levels.

At a closer distance d3, stylus 15 may measure its location (in X, Y) and maybe distance (Z) relative to the digitizer/display with maximum accuracy, and stylus 15 may send a specific status notification to system processor 20 indicating that it is sending its most accurate coordinates.

At a distance d4, the tip of the stylus is touching the surface of the digitizer sensor or the display and stylus 15 may send a specific status notification to controller 20 indicating touchdown. Some stylus location measurement techniques can measure touchdown accurately, such as resistive touch and capacitive coupling. Many measurement techniques require a second touchdown measurement technique, the most common of which is a pressure switch.

Acoustic ranging and IR-based sensing of light emitted from a digitizer sensor or visible light emitted from a display may be used to measure coordinates at a greater distance than many other methods (for example E-M or indicia imaging or capacitive). So acoustic, or IR-based sensing methods may advantageously be used to measure presence of a digitizer sensor display at a longer distance d1.

Awaking from Stylus Sleep Mode

To preserve battery power, a stylus is preferably in sleep mode when not in the presence of a display. A signal derived from most of the location measurement techniques described herein may be used to wake the stylus, (whichever is lowest power and best able to sense in-use status).

For example, where a stylus used E-M for the first location measurement technique, and optical for the fine location measurement, voltage generated in an E-M stylus during its normal stimulation by E-M waves may wake the optical circuits required to perform the fine location measurement.

Alternatively, where a stylus uses IR-based sensing for the coarse location measurement and display imaging for the fine location measurement, the infrared light sensing circuit in stylus 15 may comprise a photodiode whose signal is amplified by an amplifier, and the amplifier output may connect to the input of an analog-to-digital converter (ADC). In addition, the amplifier output may connect to a threshold detector and the threshold detector may be configured to wake stylus processor 40 when its threshold is crossed. In this case, controller 20 may also be activated from a low-power quiescent (e.g. sleep) mode by a signal from stylus 15.

Alternatively or in addition, a visible light detecting photodiode circuit may be used to detect the presence of display 11 and wake a stylus. This visible light detection technique and circuit may be used in conjunction with the stylus location measurement techniques listed herein.

Stylus Orientation

For optical styli, a display-generated cursor may be patterned to allow orientation to be sensed using an appropriate sensing technique. In addition to providing an indication of location, cursor patterns can also indicate which way is up. Orientation patterning allows the stylus to recognize display coordinates orientation vs. stylus coordinates orientation. This may be helpful in determining what direction to move (in display coordinates) the cursor in order to move the cursor toward the center of the stylus FOV image. This is especially important in monochrome displays where color sub-pixels cannot be used to measure display orientation.

Cursor shape can indicate orientation with respect to display coordinates. For example, a "T" shaped cursor may be used where the cross bar of the T is toward the top of the display, or an "L" shape may be used. Other shapes may be used.

Switching Among Certain Techniques

In some embodiments where the one of the sensing techniques (for example, the first (coarse) sensing technique) is used to sense both the stylus and multiple temporally overlapping finger touches, there may arise the issue of how to decipher which of the objects is the stylus (or which stylus is which among several that have simultaneously touched down), and, for example, which is the finger. This determination is needed so as to send one of the touch-down areas into fine location measurement technique, but not the other touchdowns. This issue can be dealt with in several ways. For example, when there is ambiguity as to which touch-down is the stylus, cursors associated with each touch-down area could be briefly pulsed in a sequential manner with a solid color until the stylus sensor sensed the pulse. Or, cursors associated with each touch-down could be pulsed simultaneously, but with a different color, such that the stylus location is determined. Both of these techniques would allow the electronics to determine which of the touch-down events are associated with certain types of optical styli. Such cursor generation and flashing could be very fast, and essentially unnoticeable to a casual user. Each of these techniques may also be used to locate and identify multiple styli each interacting with the digitizer system.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A method of locating a stylus relative to a display having a matrix of addressable pixels, comprising:
    determining a first location of the stylus relative to the display using a first stylus location measurement technique;
    determining a second location of the stylus relative to the display using a second stylus location measurement technique that is disparate from the first stylus location measurement technique:
    wherein the stylus includes electronic circuitry to enable at least one of the measurement techniques, wherein one of the first and second location techniques is a coarse measurement technique and the other of the first and second location techniques is a fine location measurement technique.

2. The method of claim 1, wherein the first location measurement technique is a coarse location measurement technique, and the second location measurement technique is a fine location measurement technique.

3. The method of claim 2, wherein the fine location is determined after the coarse location has been determined.

4. The method of claim 1, wherein the coarse location or the fine location is determined based on a location measurement technique selected from the group consisting of: resistive, mutual capacitive, matrix capacitive-to-ground, E-M, image sensing display, IR-based sensing, optical beam location, laser angle detection, acoustic ranging, surface acoustic wave, bending wave, and fixed patterns of indicia.

5. The method of claim 1, wherein the stylus includes a tip area for interacting with the display, and an optical sensor disposed within the stylus such to generate first stylus signals indicative of indicia encountered by the stylus tip.

6. The method of claim 5, wherein the indicia encountered by the stylus tip comprises a plurality of pixels passing beneath the stylus tip.

7. The method of claim 6, wherein the fine location is determined based on a location measurement technique selected from the group consisting of: optical image sensing, and optical pulse code sensing.

8. The method of claim 7, wherein each of the pixels in the display has a display state.

9. The method of claim 8, wherein the display state comprises a color.

10. The method of claim 9, wherein the fine location is determined by computing coordinates based upon information concerning the state of pixels associated with the determined coarse location in view of the first stylus signals.

11. The method of claim 10, further comprising:
    providing the determined fine location to a computing system that is coupled to the display, and wherein the computer system updates the display based on the determined fine location.

12. The method of claim 9, wherein the fine location is determined by modifying the states of one or more pixels proximate to the coarse location measurement, and computing coordinates based upon information concerning the modified states of the one or more pixels in relation to the first stylus signals.

13. The method of claim 1, wherein the first stylus measurement technique is additionally utilized to wake the stylus from a sleep mode.

14. The method of claim 1, further comprising switching between the first stylus location technique to the second stylus location technique.

15. The method of claim 14, wherein the switching is based upon the speed of the stylus relative to the display.

16. The method of claim 1, wherein both the first and second stylus location measurement techniques are independently capable of determining the stylus location relative to the display.

17. The method of claim 1, wherein the first stylus location measurement technique determines an X-Y coordinate position, and the second stylus location measurement technique determines a Z coordinate.

18. The method of claim 1, wherein the first location measurement technique provides a more accurate location than the second location measurement technique when the stylus is moving slowly and the second location measurement provides a more accurate measurement than the first technique when the stylus is moving fast.

19. The method of claim 1, wherein the first measurement is computed more rapidly than the second location and the second location measurement technique provides a more accurate measurement than the technique used to determine the first location.

20. The method of claim 1, wherein the first location measurement technique provides a more accurate location when the stylus is closer to the display and the second location measurement provides a more accurate measurement when the stylus is further from the display.

21. The method of claim 1, wherein the first location measurement indicates proximity to the display and the second location measurement provides location X-Y coordinates of the stylus relative to the display.

22. The method of claim 21, wherein the first location measurement indicating proximity also wakes the stylus from a sleep mode.

23. A digitizer system comprising:
    a stylus;
    a sensor; and
    a controller communicatively coupled to the stylus and the digitizer, wherein the controller interacts with the stylus and the sensor to determine a first location of the stylus using a first stylus location measurement technique, and to determine a second location of the stylus using a second stylus location measurement technique, wherein the stylus includes electronic circuitry to enable at least one of the measurement techniques, wherein one of the first and second location techniques is a coarse measurement technique and the other of the first and second location techniques is a fine location measurement technique.

24. The digitizer system of claim 23, wherein the controller is communicatively coupled to the stylus via a radio link.

25. The digitizer system of claim 23, wherein the first location measurement technique is a fine location measurement technique and the second location measurement technique is a coarse location measurement technique.

26. The digitizer system of claim 23, wherein the first or the second location measurement technique is determined based on a location measurement technique selected from the group consisting of: resistive, mutual capacitive, matrix capacitive-to-ground, E-M, image sensing display, IR-based sensing, optical beam location, laser angle detection, acoustic ranging, surface acoustic wave, bending wave, and fixed patterns of indicia.

27. The digitizer system of claim 23, additionally comprising:
a display having a plurality of electronically addressable pixels, and wherein the sensor is essentially transparent and disposed proximate to the display, and wherein the controller is additionally communicatively coupled to electronics that control the display.

28. The digitizer system of claim 27, wherein they stylus includes a tip area for interacting with the display, and an optical sensor disposed within the stylus to generate first stylus signals indicative of indicia encountered by the stylus tip.

29. The digitizer system of claim 27, wherein indicia encountered by the stylus tip comprises a plurality of pixels passing beneath the stylus tip.

30. The digitizer system of claim 29, wherein the second location measurement technique is based on a technique selected from the group of techniques consisting of: optical image sensing, and optical pulse code sensing.

31. The digitizer system of claim 30, wherein the second location measurement technique determines the second location based upon information concerning the state of pixels associated with the determined first location in view of the first stylus signals.

32. The digitizer system of claim 28, wherein the second location measurement technique is determined by modifying the states of one or more pixels proximate to the first location.

33. The digitizer system of claim 23, wherein the first stylus location measurement technique determines an X-Y position, and the second stylus location measurement technique determines a Z coordinate.

34. The digitizer system of claim 23, wherein the first location measurement technique additionally includes a proximity to sensor measurement.

35. The digitizer system of claim 34, wherein the proximity to sensor measurement is provided to the controller and is used by the controller to determine whether to wake the stylus from a sleep mode.

* * * * *

UNITED STATES PATENT AND TRADEMARK OFFICE
CERTIFICATE OF CORRECTION

Page 1 of 1

PATENT NO. : 9,081,448 B2
APPLICATION NO. : 13/289092
DATED : July 14, 2015
INVENTOR(S) : Geaghan It is certified that error appears in the above-identified patent and that said Letters Patent is hereby corrected as shown below:

In the specification

<u>Column 9</u>
Line 5; Delete "7,181,722" and insert -- 7,781,722 --, therefor.

In the claims

<u>Column 13</u>
Line 22, claim 1; Delete "technique:" and insert -- technique, --, therefor.

Signed and Sealed this
Twelfth Day of April, 2016

Michelle K. Lee
*Director of the United States Patent and Trademark Office*